Figure 1:
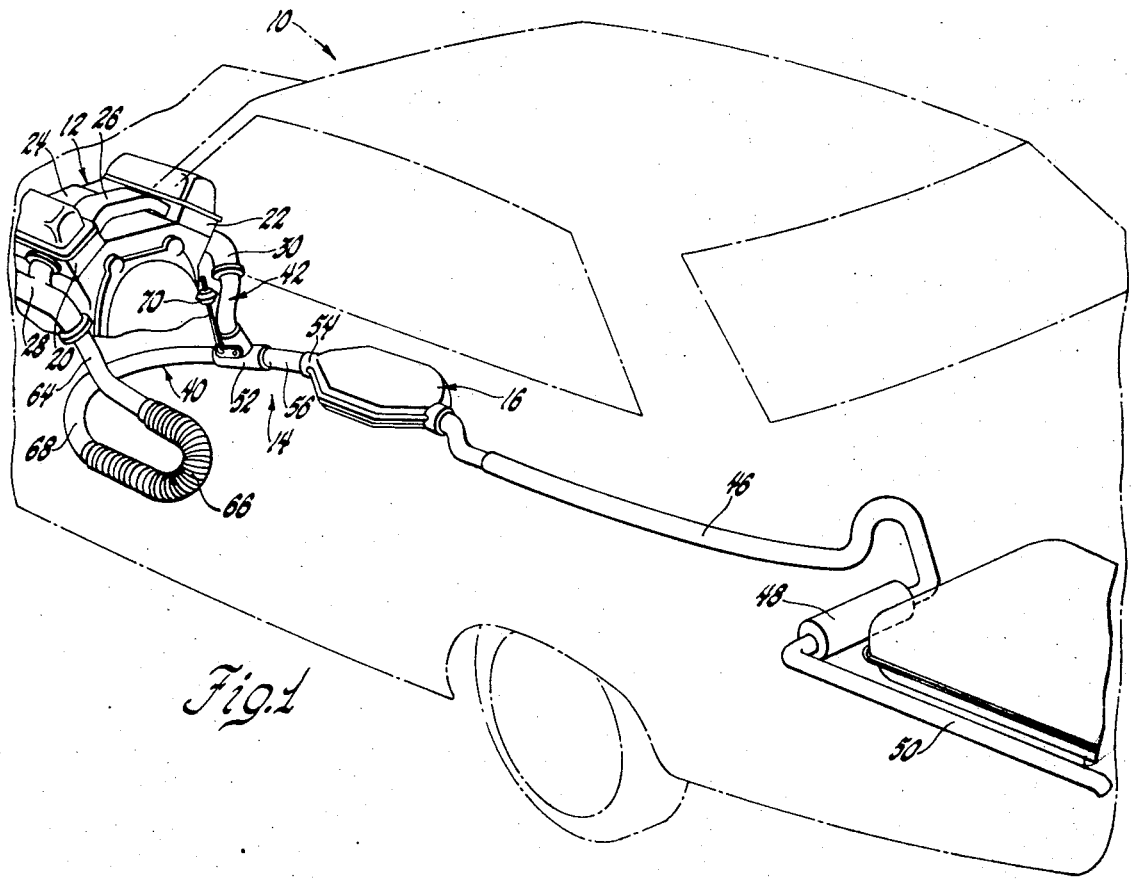

United States Patent [19]
Foster et al.

[11] 3,744,248
[45] July 10, 1973

[54] CATALYTIC CONVERTOR TEMPERATURE CONTROL SYSTEM

[75] Inventors: Michael R. Foster, Goodrich; John I. Jalbing, Millington, both of Mich.; Lester E. Patterson, deceased, Grand Blanc, Mich. by Marie L. Patterson, administratrix

[73] Assignee: General Motors Corporation, Detroit, Mich.

[22] Filed: Apr. 10, 1972

[21] Appl. No.: 242,583

[52] U.S. Cl. .................................................. 60/286
[51] Int. Cl. ............................................ F02b 75/10
[58] Field of Search ...................................... 60/286

[56] References Cited
UNITED STATES PATENTS
3,050,935  8/1962  Eastwood ............................. 60/286
3,168,806  2/1965  Calvert ................................. 60/286

*Primary Examiner*—Douglas Hart
*Attorney*—J. L. Carpenter et al.

[57] ABSTRACT

A temperature control system for a catalytic convertor in an exhaust emission system for an internal combustion engine includes a cooling loop for lowering the exhaust gas temperature to prevent overheating of the convertor. The system includes a crossover passage in the engine intake manifold and a pair of conduits separately connected to the exhaust manifolds and commonly connected at a Y-pipe including a convertor temperature responsive diverter valve that is operable to selectively route the gases through the conduits. One conduit has a relatively short length wherein the exhaust gases experience a small temperature loss and the other conduit or cooling loop has a longer length of pipe including a section of corrugated tubing having an increased heat transfer area wherein the exhaust gases experience a large temperature loss. During warmup and normal operating conditions the valve routes the exhaust gases through the crossover passage and the shorter conduit. When the convertor exceeds a predetermined temperature, the valve routes the exhaust gases through the crossover passage and the longer conduit thereby lowering exhaust gas temperature to provide a lower inlet temperature at the convertor and maintain the temperature of the convertor within a predetermined range.

3 Claims, 2 Drawing Figures

PATENTED JUL 10 1973 3,744,248

CATALYTIC CONVERTOR TEMPERATURE CONTROL SYSTEM

The present invention relates to catalytic convertor overtemperature control systems and, in particular, to a control system for a catalytic convertor in a motor vehicle exhaust emission system that incorporates a cooling loop for maintaining the operating temperature of the convertor within a predetermined temperature range.

Catalytic convertors are currently being proposed for motor vehicles to improve exhaust emission control by reduction and oxidation of exhaust contaminants. Such convertors must be quickly warmed to a minimum activating temperature of around 800°F in order to initiate combustion of residual contaminants. Thereafter, the convertor must be maintained within an operating range of between 800°F and 1500°F and, for sustained operation, preferably several hundred degrees below the upper limit. At an excessively high temperature, the catalyst in the convertor loses its activity thereby resulting in reduction of emission control. Additionally, overtemperature may cause structural failure of the convertor components. For example, wide open throttle under heavy load, prolonged vehicle coasting, improper fuel-air mixture, and faulty ignition are modes of engine operation wherein the exhaust temperature increases significantly and convertor overheating can occur.

The present invention provides a catalytic convertor overtemperature control system incorporating means for lowering the temperature of the convertor under the aforementioned conditions with minimal alteration of the engine and the exhaust system. In internal combustion engines of the V-8 type, a crossover passage is formed in the intake manifold and interconnects the exhaust manifold. During engine warmup, a portion of the exhaust gases are routed through the crossover passage to quickly heat the intake manifold thereby improving vaporization of the entering fuel mixture. The conventional exhaust system for such an engine includes a pair of conduits separately connected to the exhaust manifolds and commonly joined at a Y-pipe upstream of the catalytic convertor. To this basic system the present invention additionally incorporates a section of corrugated tubing on one conduit that provides a cooling loop having an expanded heat transfer area. A vacuum controlled diverter valve in the Y-pipe is actuated in accordance with convertor temperature to block one of the exhaust conduits. During warmup and normal engine operating conditions, the cooling loop is restricted or closed and exhaust gases flow from the one bank of cylinders through the crossover passage to the other exhaust manifold and all the gases are routed through the shorter exhaust conduit to the convertor. Routing all the gases initially through the short conduit results in a minimal temperature drop for the exhaust gases and presents a high inlet temperature to the convertor. The high inlet temperature will rapidly warm the catalyst to an operating or activating temperature at around 800°F wherein catalyst initiates the contaminant control. When the convertor temperature exceeds a predetermined level, such as would occur under the aforementioned conditions, a temperature sensor at the convertor coupled to suitable pneumatic and electrical circuitry activates the diverter valve to block the flow of exhaust gases through the shorter conduit. This reverses the direction of exhaust gas flow in the engine. Under these conditions, the exhaust gases from the cylinder on the blocked side flow through the crossover passage and all the gases from the engine are routed through the cooling loop. These gases experience a large temperature loss due to convection and radiation so as to present a substantially lowered inlet temperature to the convertor. The lower inlet temperature will, accordingly, reduce the convertor temperature and serve to reestablish the latter within the predetermined operating range.

Figure 2:
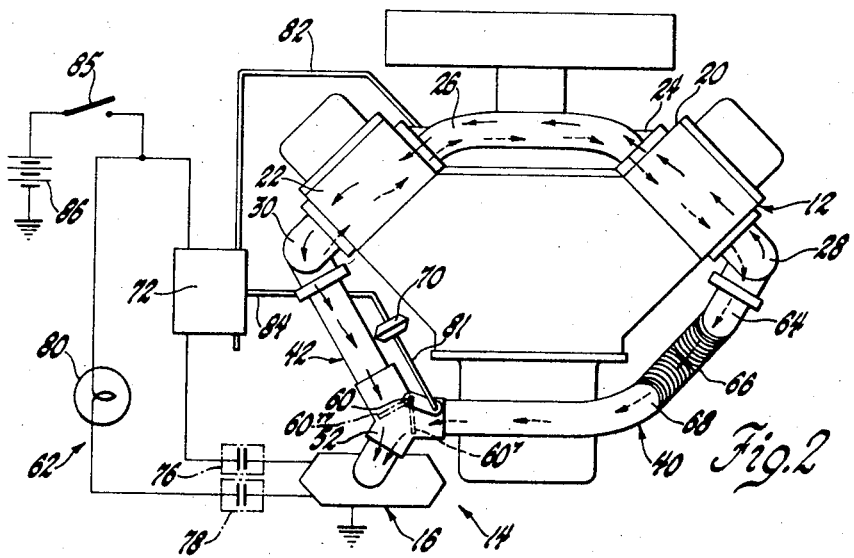

The above and other features of the present invention will be apparent to one skilled in the art upon reading the following detailed description, reference being made to the accompanying drawings illustrating a preferred embodiment of the present invention in which:

FIG. 1 is a perspective view of a motor vehicle including an internal combustion engine having an exhaust emission system incorporating a catalytic convertor overtemperature control system made in accordance with the present invention, and FIG. 2 is a schematic of internal combustion engine showing the routing of exhaust gases through the exhaust system and the circuitry for controlling the operation of the diverter valve.

Referring to FIGS. 1 and 2, there is shown a motor vehicle 10 having an internal combustion engine 12 and an exhaust emission system 14 having a catalytic convertor 16.

The engine 12 has a conventional V-type construction including opposed banks of cylinders 20, 22, an intake manifold 24 having a crossover passage 26 and exhaust manifolds 28, 30 connected to the cylinder banks 20 and 22, respectively. The intake manifold 24 and the crossover passage 26 are basically conventional in construction. During engine warmup, exhaust gases are directed through the crossover passage 26 to rapidly heat the intake manifold 24 to improve vaporization of the entering fuel mixture. As the engine temperature increases, a valve opens and the exhaust gases are routed directly through the exhaust manifold. In the present system, inasmuch as all of the gases from one bank of cylinders are constantly routed through the crossover passage 26 as hereinafter described, the valve is no longer necessary, and the crossover passage is suitably sized to handle prevailing flow.

The exhaust emission system 14 comprises a first conduit 40, a second conduit 42, a convertor 16, an intermediate exhaust pipe section 46, a muffler 48, and a tailpipe 50. The conduits 40, 42 are respectively separately connected to the exhaust manifolds 28 and 30 and commonly connected downstream thereof at a Y-pipe 52. The Y-pipe 52 is connected to the inlet 54 of the convertor 44 by a section 56. The intermediate pipe 46 is connected to the outlet 58 of the convertor 16 and thereafter to the muffler 48 in a conventional manner.

During operation of the engine 12, various residual exhaust products will be exhausted from the engine 12 through the exhaust manifolds 28 and 30 and the system 14. The catalytic convertor 16, which is conventional in construction, employs a catalyst which serves to initiate oxidiation or reduction of these combustibles to reduce the amount discharging to atmosphere through the tailpipe 50. The catalyst for the convertor must be rapidly raised by exhaust gas heat to a threshold value to around 800°F before activation of the catalyst is initiated. However, to maintain the effectiveness of the convertor, the maximum temperature therein must be limited to prevent degradation of the catalyst and failure of structural parts. A high inlet exhaust gas temperature together with increased residual products such as may occur under open throttle high load conditions, prolonged coasting, excessively rich fuel mixtures, or faulty ignition can quickly raise the convertor temperature above the acceptable upper temperature level. While this temperature can be tolerated for brief periods, the upper continuous operating temperature should be substantially below this figure.

Referring to FIG. 2, the temperature control for the convertor 16 is provided by a vacuum actuated diverter valve 60 that is pivotally housed inside the Y-pipe 52 and movable between a first position 60' and a second position 60''. The diverter valve 60 is controlled by control means 62 to selectively route the exhaust gases through either the conduit 40 or the conduit 42. The second or main conduit 42 has a relatively short length and a direct path to the convertor 16. The second conduit 42 may be insulated to provide a minimum temperature drop for quickly warming the catalyst to the operating range. When the valve 60 is in the first position 60', the flow through the first conduit 40 is blocked. Under these conditions, the exhaust gases flow as indicated by the solid line arrows from the cylinders 20 through the crossover passage 26 where they combine with exhaust gases discharging from cylinders 22. Thereafter, all the gases flow through the conduit 42 to the convertor 16.

When the temperature in the convertor 16 exceeds a predetermined level, the valve 60 is shifted to the second position 60'', the flow through the conduit 42 is blocked and the exhaust gases flow in a direction of the dotted line arrows from the cylinders 22 through the crossover passage 26 where they combine with the exhaust gases from the cylinders 20 and are commonly routed through the first conduit 40 to the convertor 44.

The first conduit or cooling loop 40 has a relatively long length and circuitous path to the convertor 16 and has an expanded heat transfer area for providing an increased heat transfer rate during the overtemperature mode of operation. This provides increased cooling of the exhaust gases and a lower inlet temperature at the convertor 44. The cooling loop 40 comprises a front section 64 connected to the exhaust manifold 28, an intermediate section 66 of corrugated tubing, and an end section 68 connected to the Y-pipe 52. The increased length of the cooling loop 40 will in itself provide an increased heat transfer in comparison with the short conduit 42, the heat transfer being primarily by radiation and convection. The corrugated tubing for the section 66 will provide a greatly increased surface area in comparison with the comparable length of straight tubing and will, accordingly, promote greater cooling of the exhaust gases.

The control means 62 comprises a vacuum motor 70, a vacuum valve 72, an operating overtemperature sensor 76, an excessive overtemperature sensor 78, and an overtemperature light 80. The vacuum motor 70 is conventional in construction and is suitably mounted on the vehicle 10, and connected to the valve 60 by a linkage 81. The vacuum valve 72 is also conventional in construction and is fluidly connected to the intake manifold 24 by a pneumatic line 82 and to the vacuum motor 70 by a pneumatic line 84. The vacuum valve 72 and the temperature sensor 76 are connected in series with a vehicle ignition switch 85 to a suitable power source such as a vehicle battery 86. The sensor 78 and the light 80 are connected in a parallel circuit with the battery 86.

The vacuum valve 72 when deenergized positions the diverter valve at the second position 60'' wherein gas flow is through the cooling loop conduit 40. Upon energization, the valve 72 connects the motor 70 to vacuum through lines 82, 84. This shifts the diverter valve 60 at position 60' and routes the exhaust gas flow through the second conduit 42. Accordingly, upon loss of vacuum or electrical power, the exhaust gas flow will be routed through the cooling loop 40 to provide exhaust gas cooling. The sensor 76 includes contacts which are normally closed below the desired upper operating temperature of around 1000°F. The sensor 78 includes contacts which are normally open below a predetermined excessive temperature of around 1500°F. During warmup, the contacts of sensor 76 and the switch 85 will be closed. The valve 72 will be energized or open and vacuum will be applied to the vacuum motor 70 causing the valve 60 to assume the position 60' wherein the conduit 40 is blocked. This will route all exhaust gases in the direction of the solid arrows to the convertor 16. After warmup and during normal operation, the valve 60 will remain in this position 60' and the convertor 16 will function to oxidize and reduce contaminants. When the temperature at the convertor exceeds the predetermined operating temperature, the contacts 76 are opened thereby deenergizing and closing the valve 72 and disconnecting the motor 70 from vacuum. This will shift the diverter valve 60 to position 60'' wherein the conduit 42 is blocked and the exhaust gases are routed in the direction of the dotted line arrows through the cooling loop conduit 40. This will reduce the temperature of the exhaust gases in the aforementioned manner and present a lower inlet temperature to the convertor 16. When the convertor temperature drops below the predetermined operating temperature, the contacts of sensor 76 close thereby opening valve 72 and connecting the motor 70 to a manifold vacuum whereby the valve 60 shifts to position 60'. Under abnormal conditions, such as caused by extremely enriched fuel mixtures, faulty ignition or the like, the convertor temperature may exceed a temperature whereat catalyst degradation and structural convertor failure may occur. At this temperature, the contacts of sensor 78 will close thereby illuminating the overtemperature light and indicating that further vehicle operation should be avoided.

While the system as herein described is directed toward achieving the above overtemperature control with minimal alteration to engine and exhaust configuration, it is apparent that the thermal characteristics of conduits 40 and 42 and the operation of the valve 60 may be changed. For instance, the conduit 40 may be insulated to provide a lesser temperature loss therein. Additionally, the cooling effect of the cooling loop 42 can be increased by providing increased or more efficient heat transfer surfaces thereon. Additionally, the operation of the valve 60 can be modulated to provide various degrees of opening to divide the flow between the conduits 40 and 42 in the intermediate temperature ranges.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In a motor vehicle, the combination comprising: an internal combustion engine having a pair of exhaust manifolds for discharging exhaust gases; passage means on said engine fluidly connecting said manifolds; a catalytic convertor; first conduit means fluidly connecting one of said manifolds to said convertor, said first conduit means including heat transfer means for lowering the temperature of exhaust gases flowing therethrough; second conduit means fluidly connecting the other of said manifolds to said convertor; valve means selectively operative to restrict the flow of exhaust gases through said conduits; means for actuating said valve means to restrict said first conduit means when the catalytic convertor is operating below a predetermined temperature so as to route substantially all exhaust gases from said one of said manifolds through said passage means to the other of said manifolds whereby the exhaust gases from both manifolds are routed through the second conduit means to said catalytic convertor, said means actuating said valve means to restrict said second conduit means when said catalytic convertor is operating above said predetermined temperature so as to route substantially all the exhaust gases from said other of said manifold through said passage means to said one of said manifolds whereby the exhaust gases from both manifolds are routed through said first conduit means and said heat transfer means to the convertor thereby lowering the temperature of the exhaust gases prior to entering said convertor.

2. In a motor vehicle, the combination comprising an internal combustion engine having an intake manifold and first and second exhaust manifolds from which exhaust gases are discharged during operation of the engine; a crossover passage in said intake manifold fluidly connecting said first and second exhaust manifolds; a catalytic convertor adapted for operation within a predetermined temperature range; a first conduit fluidly connected to said first exhaust manifold; a second conduit having a substantially greater length than said first conduit fluidly connected to said second exhaust manifold; a section on said second conduit having an expanded heat transfer area for radiantly cooling the exhaust gases flowing therethrough; a third conduit commonly connecting said first and second conduits to said convertor; a valve in said third conduit, said valve operable in one position to block the flow of gases in said first conduit and operable in another position to block the flow of gases in said second conduit; control means for actuating said valve between said positions to block said second conduit when the catalytic convertor is operating within or below said predetermined temperature range so as to route substantially all the exhaust gases from said second exhaust manifold through said crossover passage to said first exhaust manifold whereby the exhaust gases from both exhaust manifolds are routed through the second conduit to said catalytic convertor, said control means actuating said valve to block said first conduit when said catalytic convertor is operating above said predetermined temperature range so as to route substantially all the exhaust gases from said first exhaust manifold through said crossover passage to said second exhaust manifold whereby the exhaust gases from both manifolds are routed through said second conduit and said section to the convertor thereby cooling the exhaust gases and reducing the operating temperature of said convertor to within said predetermined temperature range.

3. A catalytic convertor overtemperature control system for a motor vehicle comprising: an internal combustion engine on said vehicle including an intake manifold; first and second exhaust manifolds on said engine from which exhaust gases are discharged during operation of the engine; a crossover passage in said intake manifold fluidly connecting said first and second exhaust manifolds; a catalytic convertor adapted for operation within a predetermined temperature range; a first conduit having one end fluidly connected to said first exhaust manifold; a second conduit having a substantially greater length than said first conduit, said second conduit having one end fluidly connected to said second exhaust manifold; a section of corrugated tubing on said second conduit, said corrugated tubing having an expanded heat transfer area for radiant cooling of the exhaust gases flowing therethrough; a Y-pipe connecting the other ends of said first and second conduits and said convertor; a valve in said Y-pipe, said valve movable to a one position wherein the flow of exhaust gases through said first conduit is prevented and movable to another position wherein the flow of gases through said second conduit is prevented; a vacuum motor connected to said valve for moving said valve between said positions; control means including temperature sensing means, said sensing means mounted on said convertor for sensing the temperature thereof, said control means actuating said vacuum motor to move said valve to said one position when the catalytic convertor is operating within or below said predetermined temperature range as determined by sensing means so as to route substantially all the exhaust gases from said second exhaust manifold through said crossover passage to said first exhaust manifold whereby the exhaust gases from both exhaust manifolds are routed through the second conduit to said catalytic convertor, said control means actuating said valve to another position when said catalytic convertor is operating above said predetermined temperature range as determined by said sensing means so as to route substantially all the exhaust gases from said first exhaust manifold through said crossover passage to said second exhaust manifold whereby the exhaust gases from both manifolds are routed through said second conduit and said corrugated tubing to the convertor thereby cooling the exhaust gases and reducing the operating temperature of said convertor to within said predetermined temperature range.

* * * * *